(12) United States Patent  
Gardner

(10) Patent No.: US 7,222,394 B2  
(45) Date of Patent: May 29, 2007

(54) BUSHING FOR METAL STUDS AND THE LIKE

(75) Inventor: Michael J. Gardner, Hudson, OH (US)

(73) Assignee: Halex/Scott Fetzer Company, Bedford, OH (US)

( * ) Notice: Subject to any disclaimer, the term of this patent is extended or adjusted under 35 U.S.C. 154(b) by 10 days.

(21) Appl. No.: 11/074,551

(22) Filed: Mar. 8, 2005

(65) Prior Publication Data

US 2006/0200936 A1 Sep. 14, 2006

(51) Int. Cl.
*F16L 5/00* (2006.01)
*H02G 3/22* (2006.01)

(52) U.S. Cl. .......................................... 16/2.1; 411/182
(58) Field of Classification Search ............... 16/2.1, 16/2.2, 2.5; 174/152 R, 153 R, 154, 153 G, 174/167, 152 G; 411/173–175, 177, 181, 411/113, 182; 24/713.6, 297
See application file for complete search history.

(56) References Cited

U.S. PATENT DOCUMENTS

| | | | |
|---|---|---|---|
| 3,372,441 A | 3/1968 | Fisher | |
| 4,289,288 A | 9/1981 | Gransberry et al. | |
| 4,520,976 A * | 6/1985 | Cournoyer et al. | 248/56 |
| 4,762,437 A * | 8/1988 | Mitomi | 403/11 |
| 5,162,612 A * | 11/1992 | Naka et al. | 174/48 |
| 5,216,206 A * | 6/1993 | Maesako | 174/153 G |
| 5,448,809 A * | 9/1995 | Kraus | 24/297 |
| 5,488,198 A | 1/1996 | Kramer | |
| 5,537,714 A | 7/1996 | Lynch, Jr. et al. | |
| 5,606,784 A * | 3/1997 | Hamamoto | 24/662 |
| 5,627,342 A | 5/1997 | Kramer | |
| 5,628,087 A | 5/1997 | Gretz | |
| 5,739,468 A | 4/1998 | Rossman et al. | |
| 5,806,140 A * | 9/1998 | Carlson et al. | 16/2.1 |
| 5,836,212 A | 11/1998 | Bates | |
| 5,981,877 A | 11/1999 | Sakata et al. | |
| 6,088,876 A | 7/2000 | Daoud | |
| 6,209,175 B1 * | 4/2001 | Gershenson | 24/297 |
| 6,263,634 B1 | 7/2001 | Bodnar et al. | |
| 6,460,638 B1 | 10/2002 | Strunsee et al. | |
| 6,598,835 B2 | 7/2003 | Minnick | |
| 6,765,148 B2 | 7/2004 | Rix | |
| 6,901,627 B2 * | 6/2005 | Uchida | 16/2.1 |
| 2003/0131443 A1 * | 7/2003 | Trent | 16/2.1 |
| 2003/0226233 A1 * | 12/2003 | Katayama | 16/2.1 |

* cited by examiner

*Primary Examiner*—Robert J. Sandy
*Assistant Examiner*—Andre' L. Jackson
(74) *Attorney, Agent, or Firm*—Pearne & Gordon LLP

(57) ABSTRACT

A one piece plastic stud bushing having a body forming an opening through the bushing, a flange at one end, flexible holding tabs on opposite sides of the opening, the holding tabs having shoulders spaced from the flange a distance sufficient to receive a range of metal thicknesses, and spring tabs on opposite sides of the opening angled away from the flange to engage the stud surface opposite to the surface next to the holding tab shoulders.

4 Claims, 3 Drawing Sheets

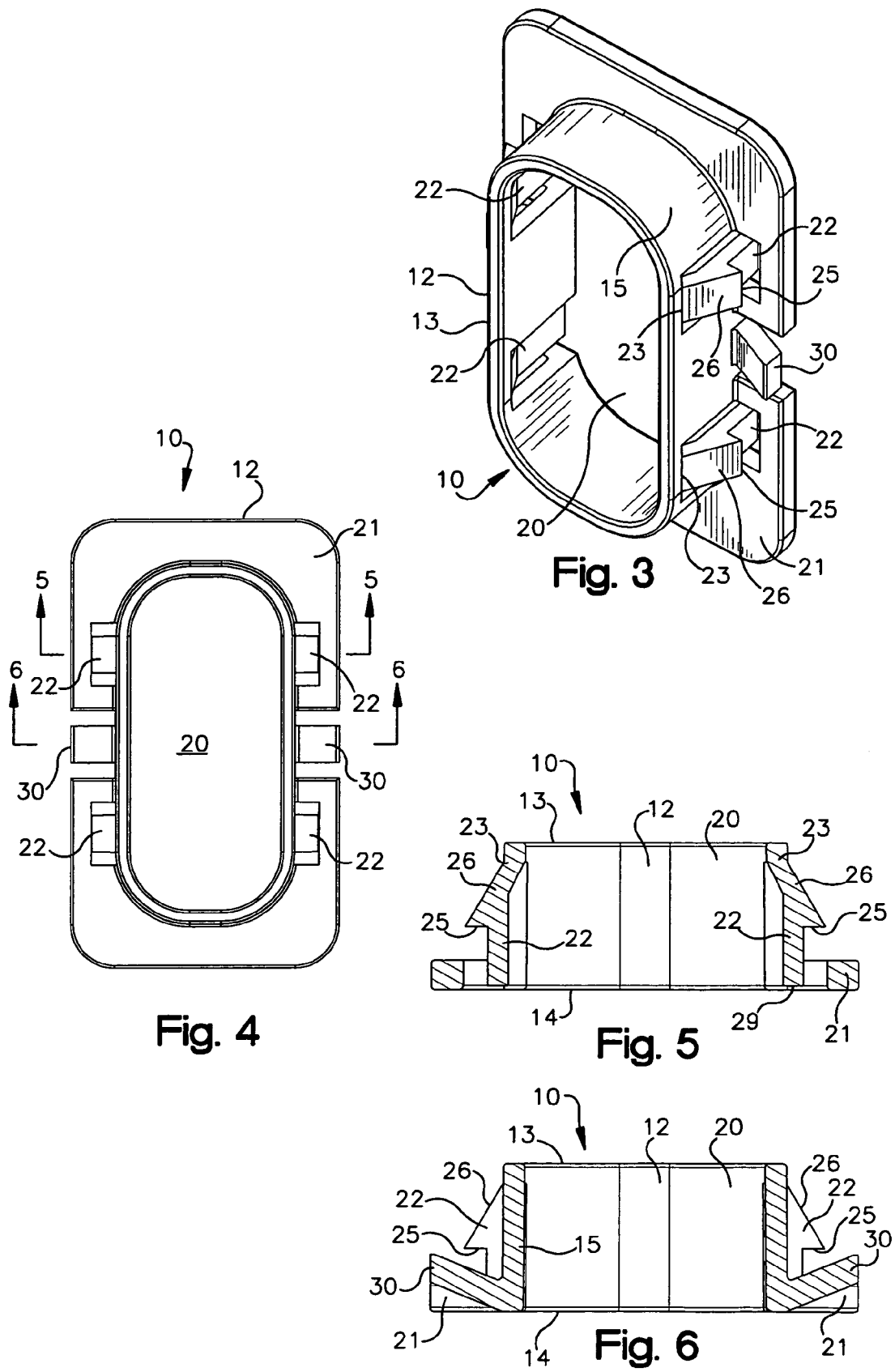

US 7,222,394 B2

BUSHING FOR METAL STUDS AND THE LIKE

TECHNICAL FIELD

The present invention relates generally to bushings, and, more specifically, to bushings for protecting utility system components such as electrical cable, electrical conduit, pipes and the like, that extend through metal studs and other metal members.

BACKGROUND OF THE INVENTION

Metal studs used in modern construction are formed with openings for components, such as electrical cables, electrical conduit, pipes and the like, that extend through the studs. These openings, which are formed in various ways, such as by stamping, cutting, punching and the like, often have sharp edges which can abrade or cut cable insulation or otherwise damage the components extending through the stud openings. Consequently, it is a common practice to protect provide bushings which fit into the stud openings to cover their edges.

Various types of bushings are known and used for the purpose described. One known construction is composed of two parts which snap together when the bushing is installed in a stud opening. This type of bushing has several disadvantages and objections, including the need to make and store multiple parts, and the time and inconvenience of handling and assembling the bushing parts on site.

One piece bushings are known, but also present certain problems and disadvantages. For example, some of the conventional one piece bushings are difficult to insert into the stud opening. This is particularly true when the bushings are configured to resist being dislodged as the electrical cables or other components are pulled through them.

Another objection common to both and multiple piece and one piece bushings of the prior art is that they are not designed so that a single bushing can accommodate a wide range of different metal thicknesses. Since metal studs are made with different thicknesses, it has been necessary to maintain a supply of different size bushings that can be selected and used depending upon the stud structure.

SUMMARY OF THE INVENTION

An object of the present invention is to provide a one piece plastic stud bushing that can be easily and firmly snapped into a stud opening to cover its edges and protect components extending through the stud opening.

A more particular object of the invention is to provide a one piece plastic stud bushing constructed in a unique manner that assures firm and secure engagement in the stud opening, the bushing having side holding portions that spring against opposite edges of the stud opening and portions adjacent opposite surfaces of the stud that hold the bushing snugly in place.

Another object of the invention is to provide a stud bushing as described in the previous paragraph which can be fitted in studs having different metal thicknesses.

The bushing of the invention generally comprises a body having a wall that forms an opening through the bushing, a flange laterally extending from the wall at one end of the body, flexible holding tabs or fingers forming part of the wall on opposite sides of the opening, the holding tabs having fixed ends near one end of the bushing body, free ends near the flanged end of the body and shoulders between the fixed and free ends, the shoulders being spaced from the flange to define areas that receive the edge portions of the stud opening in which the bushing is inserted. The bushing also has spring tabs at the flanged end of the body on opposite sides of its opening. These spring tabs extend away from the bushing wall and are angled away from the flange so that they press against the surface of the stud to keep the bushing snug after installation. The holding tabs or fingers preferably have ramp surfaces extending from their fixed ends to the tab shoulders, whereby the tabs are flexed inwardly of the bushing opening as the bushing is inserted into the opening of the stud.

One disclosed embodiment has one spring tab and two holding tabs on each side of the bushing opening. Another disclosed embodiment has one holding tab and two spring tabs on each side of the bushing opening. Each embodiment can be used in studs having varying metal thicknesses. For example, the embodiment having two holding tabs and one spring tab on each side of the bushing opening may accept metal thicknesses ranging from about 0.017–0.075 inches. A bushing having two spring tabs and one holding tab on each side of the bushing opening may accept metal thicknesses ranging from about 0.017–0.130 inches. It is contemplated that the bushing also can be made with other numbers of holding tabs and spring tabs.

A unique feature of the new bushing is the way that it is secured in the stud opening and is prevented from being inadvertently dislodged. The holding tabs spring out against the side edges of the stud opening to provide side holding forces. When the bushing is installed, the shoulders of the holding tabs are adjacent one surface of the stud and the spring tabs press against the opposite surface, thereby holding the bushing snugly in the stud opening.

The spacing between the shoulders of the holding tabs and the flange of the bushing is sufficient to accept a wide range of metal thicknesses. Thus, the bushing of the invention can be used in studs of different thicknesses, while achieving the unique securement feature described above.

The bushing of the invention is easily inserted into the opening of a stud by pressing on the flange at the end of the bushing body. As the bushing is pressed into the opening, the holding tabs are flexed inwardly of the bushing opening. When the bushing is fully seated, the edges of the openings are between the shoulders and the flange so that the holding tabs snap back to their normal positions to hold the bushing in place. As noted above, the spring tabs press against the metal surface adjacent the flange to keep the bushing snug after installation.

Other advantages and a fuller understanding of the invention will he had from the following detailed description and the accompanying drawings.

BRIEF DESCRIPTION OF THE DRAWINGS

FIG. 3 is a perspective view of the embodiment of FIG. 1.

FIG. 4 is an end view of the bushing looking toward the flanged end.

FIG. 5 is a cross-sectional view taken along the line 5—5 of FIG. 4.

FIG. 6 is a cross-sectional view taken along the line 6—6 of FIG. 4.

DESCRIPTION OF THE INVENTION

Figure 1:
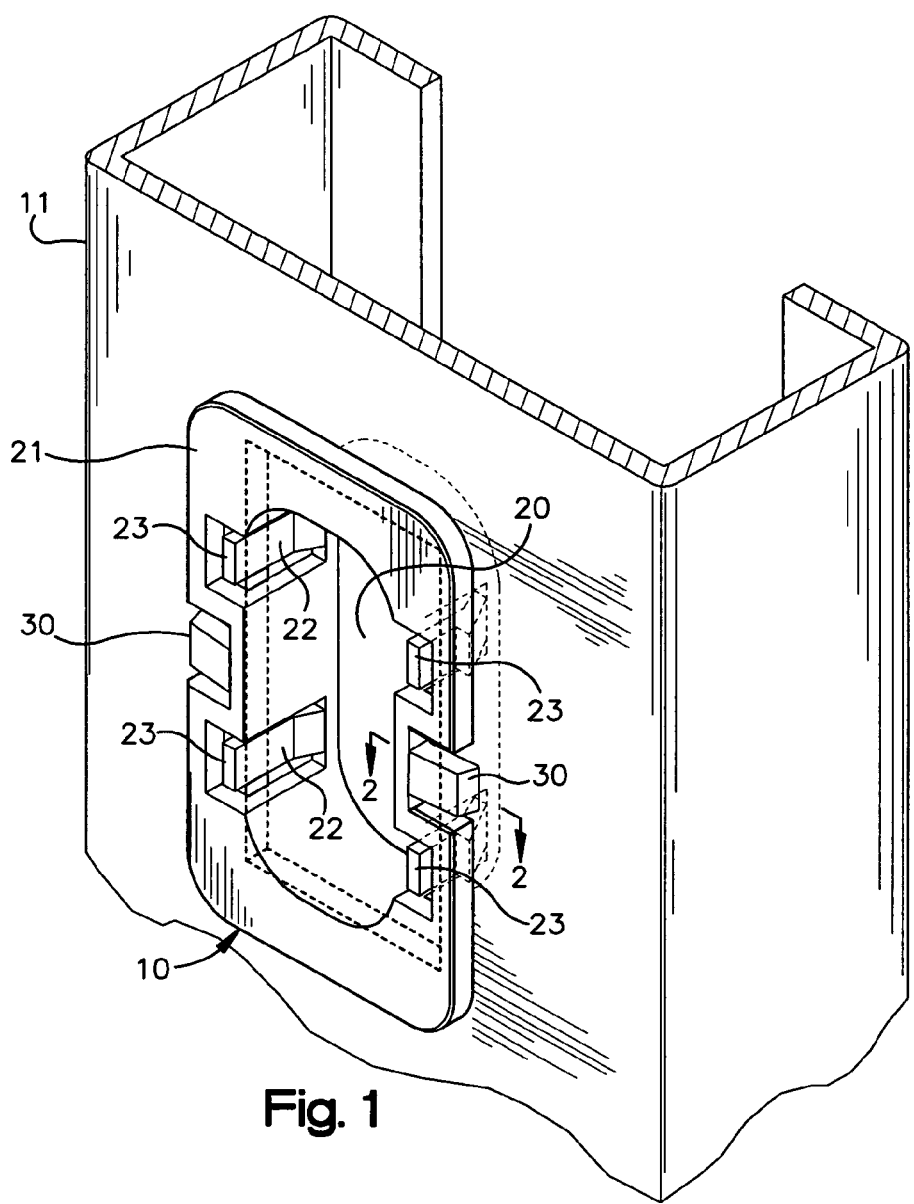
FIG. 1 is a perspective view of one embodiment of the invention installed in the opening of a metal stud.
Figure 2:
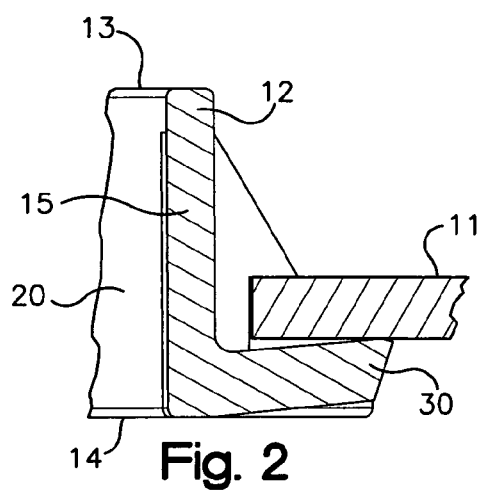
FIG. 2 is a fragmentary cross-sectional view taken along the line 2—2 of FIG. 1.

Referring now to the drawings, the embodiment of the invention illustrated in FIGS. 1–6 is generally designated by reference numeral 10. In FIG. 1 the bushing 10 is shown inserted into the opening of a metal wall stud 11, although it is to be understood that the bushing of the invention can be inserted in other types of studs. While the bushing of the invention has been specifically designed for use in studs of various types, the bushing also can be used in any application where it is desirable to cover the edges of an opening through a metal member.

The bushing 10 comprises a body 12 having first and second ends 13, 14, respectively, and a wall 15 forming an opening 20 through the bushing 10. The opening 20 is sized to receive and protect components extending through the opening of the stud 11.

A flange 21 extends away from the wall 15 at the end 14 of the bushing 10. As shown in FIG. 1, the flange 21 confronts one surface of the stud 11 when the bushing 10 has been installed.

Two flexible holding tabs or fingers 22 are located in the wall 15 on each side of the opening 20. As most clearly shown in FIGS. 3 and 5, the holding tabs 22 have fixed ends 23 near the end 13 of the body 12 and free ends 24 near the end 14 of the bushing body 12. The fingers 22 also have shoulders 25 between the fixed and free ends 23, 24, respectively, of the fingers or tabs 22. The shoulders 25 are spaced from the flange 21. The edge portions of the stud 11 defining its opening are received between the flange 21 and the shoulders 25. Preferably, the holding tabs 22 are provided with ramp surfaces 26 extending from the free ends 23 to the shoulders 25. When the bushing 10 is installed, the edges of the stud opening engage the ramp surfaces 26 to flex the holding tabs 22 inwardly of the opening 20. When fully installed, the holding tabs 22 snap back to the position illustrated in FIG. 5 with the edges of the stud opening between the shoulders 25 and flange 21.

The bushing body 12 also includes a spring tab 30 on each side of the bushing opening 20 at the first end 14 of the body 12. The spring tabs 30 extend away from the wall 15 at an angle to the flange 21. When the bushing 10 has been installed in the stud 11, the tabs 30 are "sprung" against the surface of the stud to hold the bushing firmly in place.

The installation of the bushing 10 will be largely apparent from the foregoing description. The bushing end 13 is inserted into the opening of the stud 11 by pressing on the flange 21. As the bushing is pressed through the opening of the stud, the fingers 22 flex inwardly of the bushing opening 20 until the edges of the stud opening are between shoulders 25 and the flange 21, whereupon the holding tabs 22 snap outwardly against the side edges of the stud opening to hold the bushing in place. The spacing between the flange 21 which is at one surface of the stud 11 and the holding tab shoulders 25 which are at the opposite stud surface is made sufficient to accommodate a range of metal thicknesses. The spring tabs 30 which extend out of the flange 21 toward the shoulders 25 provide a spring force against the stud surface to snugly hold the bushing 10 in place.

Figure 7:
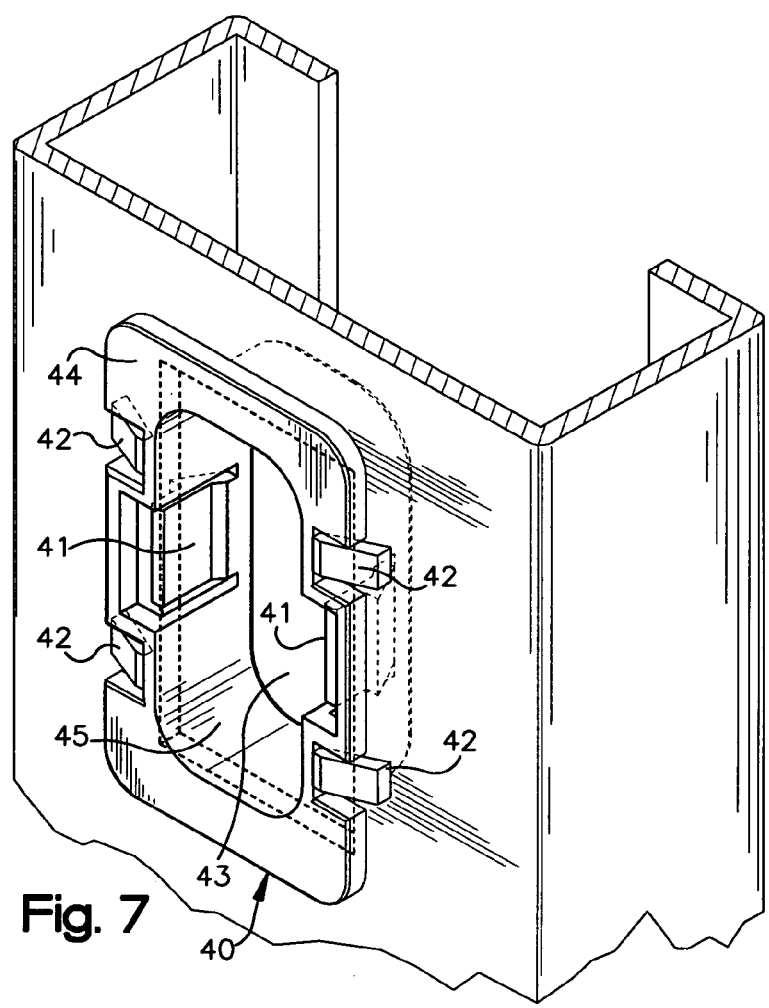
FIG. 7 is a perspective view of another embodiment of the invention installed in a metal stud.
Figure 8:
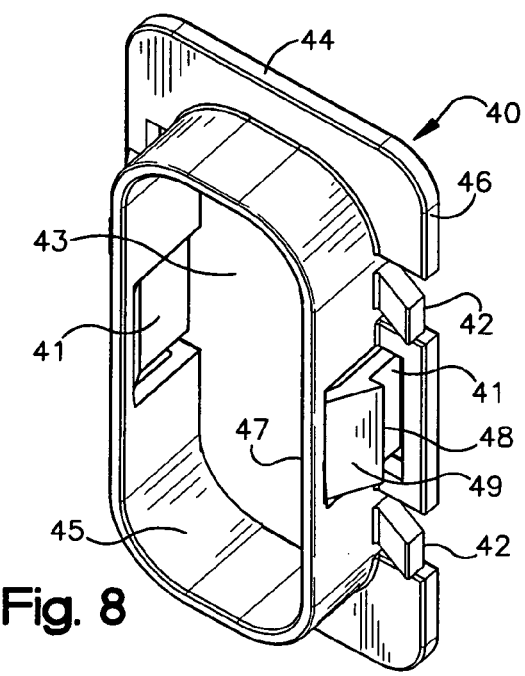
FIG. 8 is perspective view of the bushing of FIG. 7.

Reference is now made to FIGS. 7 and 8 which illustrate another embodiment of the invention. The bushing of this embodiment is generally designated by reference numeral 40. As distinguished from the bushing 10, the bushing 40 has one holding tab 41 and two spring tabs 42 on each side of the bushing opening 43. A flange 44 extends from the bushing wall 45 at one end 46 of the bushing.

The two holding tabs 41 are similar to the holding tabs 22 of the previously described bushing 10, and each comprises a fixed end near the bushing end 47 and a free end near the bushing end 46. The holding tabs 41 have shoulders 48 spaced from the flange 44 and ramp surfaces 49 extending from their fixed ends to the shoulders. The spring tabs 42 are similar to the spring tabs 30. The spring tabs 42 extend away from the bushing wall 45 in spaced relation to the flange 44 and are angled toward the bushing end 47, whereby the spring tabs 48 press against the stud 11 when the bushing has been inserted. The action of the holding tabs 41 and the spring tabs 48 in keeping the bushing 40 in place is the same as previously described in connection with the bushing 10.

Both embodiments of the invention are shown inserted in stud openings of nearly the same size and shape as the bushing. In different installations or applications, the opening through the stud or other member may be elongated and two or more bushings installed in the opening. When multiple bushings are installed in an elongated opening, the adjacent flange portions may be removed so that the bushing openings are close to one another.

Other variations and modifications of the invention will be apparent to those skilled in the art in light of the foregoing disclosure. It is to be understood that, within the scope of the appended claims, the invention can be practiced otherwise than as specifically shown and described.

The invention claimed is:

1. A bushing for insertion into a wall opening of a metal stud or the like having opposed wall surfaces and a range of different wall thicknesses comprising:

a body having first and second open ends and a continuous wall forming a bushing opening between said ends, a flange extending from said wall at said first end of said body, flexible holding tabs in said wall on each side of said bushing opening, said holding tabs having fixed ends adjacent said second end of said body, free ends extending toward said first end of said body, and shoulders between said fixed and free ends, said shoulders being spaced from said flange a distance sufficient to accommodate stud walls of different thicknesses, and flexible spring tabs at said first end of said body on each side of said bushing opening, said spring tabs angling away from said flange towards said second end of said body and said shoulders of said holding tabs so as to engage and apply a spring force against one wall surface of a stud while its opposed wall surface is engaged by said holding tab shoulders, whereby said bushing will be held firmly in place in stud walls of different thicknesses by the coaction of said holding tabs and said spring tabs.

2. A bushing as claimed in claim 1 wherein there are two holding tabs and one spring tab on each side of said bushing opening.

3. A bushing as claimed in claim 1 wherein there are two spring tabs and one holding tab on each side of said bushing opening.

4. A bushing as claimed in claim 1 wherein each of said holding tabs has a ramp surface between its fixed end and its shoulder, whereby said holding tabs are flexed inwardly of said bushing opening when said bushing is inserted into said member.

* * * * *